United States Patent
Shim et al.

(10) Patent No.: US 9,552,105 B2
(45) Date of Patent: Jan. 24, 2017

(54) DISPLAY DEVICE HAVING MULTI-TOUCH RECOGNIZING FUNCTION AND DRIVING METHOD THEREOF

(75) Inventors: Yeon Shim Shim, Seoul (KR); Hyung Uk Jang, Gyeonggi-do (KR); Sang Hyuck Bae, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1700 days.

(21) Appl. No.: 11/798,125

(22) Filed: May 10, 2007

(65) Prior Publication Data

US 2008/0143682 A1    Jun. 19, 2008

(30) Foreign Application Priority Data

Dec. 13, 2006    (KR) .................. 10-2006-0127351

(51) Int. Cl.
*G06F 3/042*    (2006.01)

(52) U.S. Cl.
CPC .................................. *G06F 3/0428* (2013.01)

(58) Field of Classification Search
CPC .................................................... G06F 3/0428
USPC ............................ 345/175; 178/18.01, 18.09
See application file for complete search history.

(56) References Cited

U.S. PATENT DOCUMENTS

| | | | |
|---|---|---|---|
| 4,247,767 A | 1/1981 | O'Brien et al. | |
| 4,746,770 A | 5/1988 | McAvinney | |
| 6,061,177 A * | 5/2000 | Fujimoto | 359/443 |
| 6,421,042 B1 * | 7/2002 | Omura et al. | 345/157 |
| 6,803,906 B1 * | 10/2004 | Morrison et al. | 345/173 |
| 2001/0022579 A1 * | 9/2001 | Hirabayashi | 345/175 |
| 2003/0043116 A1 | 3/2003 | Morrison et al. | |
| 2003/0085871 A1 * | 5/2003 | Ogawa | 345/158 |
| 2005/0077452 A1 * | 4/2005 | Morrison et al. | 250/221 |
| 2005/0110964 A1 * | 5/2005 | Bell et al. | 353/122 |
| 2007/0280669 A1 * | 12/2007 | Karim | 396/155 |
| 2008/0122754 A1 | 5/2008 | Sacher | |

FOREIGN PATENT DOCUMENTS

| | | |
|---|---|---|
| CN | 1635541 A | 7/2005 |
| CN | 2751317 Y | 1/2006 |
| DE | 10 2005 008 834 A1 | 8/2006 |
| JP | 2002-91686 A | 3/2002 |
| JP | 2002-351615 A | 12/2002 |
| JP | 2003-114755 A | 4/2003 |

OTHER PUBLICATIONS

Office Action issued Nov. 20, 2009 in corresponding Chinese Application No. 200710105431.4.
Office Action issued Jan. 19, 2010 in corresponding Japanese Application No. 2007-169616.
Office Action dated Jan. 29, 2014 from the German Patent and Trademark Office in counterpart application No. 10 2007 021 537.3-53.

* cited by examiner

*Primary Examiner* — Sahlu Okebato
(74) *Attorney, Agent, or Firm* — Morgan, Lewis & Bockius LLP

(57) ABSTRACT

A display device having a multi-touch recognition function includes an integration module having a plurality of cameras integrated at an edge of a display panel; and a processor that detects a touch area using at least first and second images captured by the plurality of cameras, respectively.

12 Claims, 10 Drawing Sheets

DISPLAY DEVICE HAVING MULTI-TOUCH RECOGNIZING FUNCTION AND DRIVING METHOD THEREOF

This application claims the benefit of the Korean Patent Application No. 10-2006-127351 filed on Dec. 13, 2006, which is hereby incorporated by reference in its entirety.

BACKGROUND OF THE INVENTION

Field of the Invention

Embodiments of the present invention relate to a display device, and more particularly to a display device and a driving method thereof. Embodiments of the present invention are suitable for a wide scope of applications. In particular, embodiments of the present invention are suitable for providing multi-touch recognition capabilities to a display device.

Description of the Related Art

Generally, a touch panel is a type of user interface that is attached to a display device with the property that an electrical characteristic thereof is changed at a contact point where a hand or a pen touches the panel. Touch panels have been used in various applications, such as in small portable terminals, office equipment and the like. However, if a multi-touch is generated by two or more substantially simultaneous contact points, the touch panel might malfunction or any one of the touches can be selected by a pre-set program.

In order to overcome the limit of multi-touch recognition in the touch panel of the related art, there has recently been developed a multi-touch recognition device which simultaneously recognizes a plurality of touches. However, since the multi-touch recognition device is manufactured in a structure which is separated from the display device, the appearance deformation of the display device is generated in order to attach the multi-touch recognition device to the display device. In this case, if the multi-touch recognition device is attached to the display device, an assembling process is complicated, and a volume is increased, so that a large space is required. Furthermore, since the display device and the multi-touch recognition device are not a single unit, a structural stability is decreased between the display device and the multi-touch recognition device. On the other hand, there is a method of embedding an optical sensor of the multi-touch recognition device in each pixel of the display device, but this method has another problem in that the aperture ratio of the display device is decreased to lower the brightness thereof due to the optical sensor.

SUMMARY OF THE INVENTION

Accordingly, embodiments of the present invention are directed to a display device having multi-touch recognizing function and a driving method thereof, which substantially obviate one or more problems due to limitations and disadvantages of the related art.

An object of the present invention to provide a display device having multi-touch recognizing function that obtain a strong structural stability for the touch recognition system.

Another object of the present invention to provide a display device having multi-touch recognizing function that maintains an appearance of the display device.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the present invention, as embodied and broadly described, a display device having a multi-touch recognition function includes an integration module having a plurality of cameras integrated at an edge of a display panel; and a processor that detects a touch area using at least first and second images captured by the plurality of cameras, respectively.

In another aspect, a display device includes a display panel for displaying display data representative of a display image; first and second capture devices assembled with the display panel, each of the first and second capture devices capturing first and second captured images of the display panel; and a processor that compares the display data with each of the first and second captured images to detect a touch area on the display panel.

In another aspect, a method of detecting a touch area on a display device including a display panel for displaying display data representative of a display image and a plurality of synchronized capture devices assembled with the display panel includes substantially simultaneously capturing first, second, third and fourth captured images of the touched display panel using corresponding ones of the synchronized captured devices; and comparing the display data with each of the first and second captured images to detect a touch area on the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of embodiments of the present invention. In the drawings.

DETAILED DESCRIPTION OF EXEMPLARY EMBODIMENTS

Reference will now be made in detail to exemplary embodiments of the present invention, examples of which are illustrated in the accompanying drawings.

Figure 1:
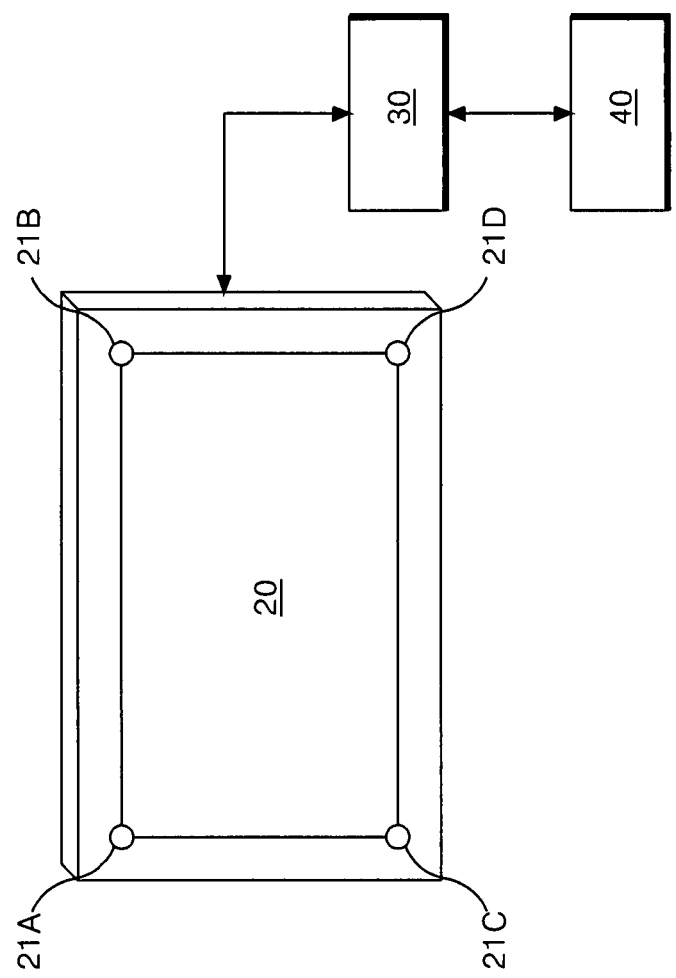
FIG. 1 shows a block diagram representation of an exemplary display device having a multi-touch recognition function according to an embodiment of the present invention.

FIG. 1 shows a block diagram representation of an exemplary display device having a multi-touch recognition function according to an embodiment of the present invention. Referring to FIG. 1, a display device having a multi-touch recognition function according to an embodiment of the present invention includes a touch and display module 20 where cameras 21A to 21D are disposed in four corners of a pixel array 10A on which a picture is displayed; a control board 30 which controls the touch and display module 20 and calculates the coordinates of a touch point; and a system 40 for supplying the data RGB that are to be displayed along with a timing signal, to the control board 30.

Figure 2:
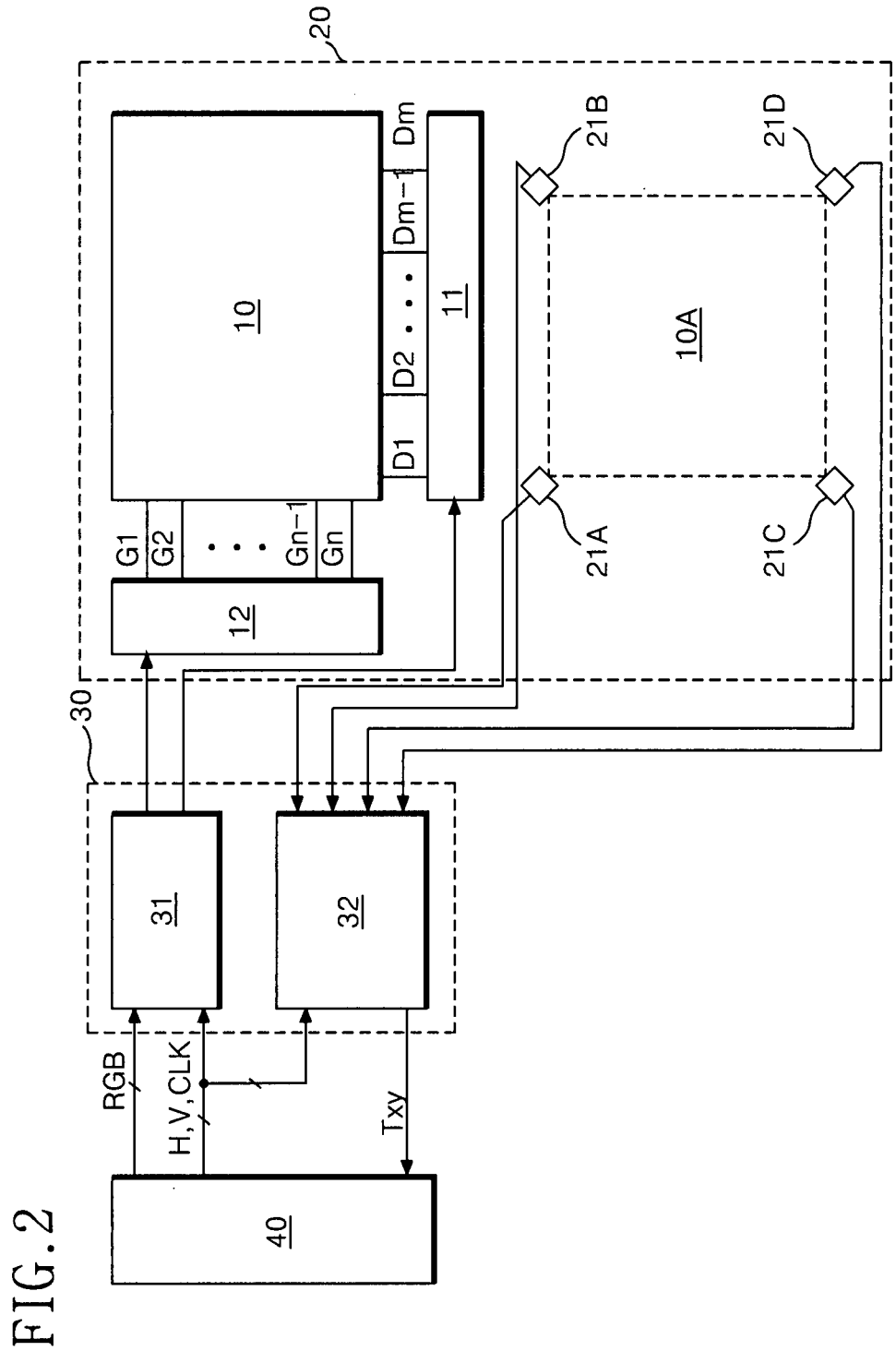
FIG. 2 shows a schematic description of the display device of FIG. 1.

FIG. 2 shows a schematic description of the display device of FIG. 1. Referring to FIG. 2, the touch and display module 20 includes a liquid crystal display panel 10 where a pixel array 10A on which a picture is displayed is formed; a source driver 11 for supplying data voltages to data lines D1 to Dm of the liquid crystal display panel 10; a gate driver 12 for supplying scan pulses to gate lines G1 to Gn of the liquid crystal display panel 10; and cameras 21A to 21D each disposed in the vicinity of the four corners of the liquid crystal display panel 10.

Figure 3:
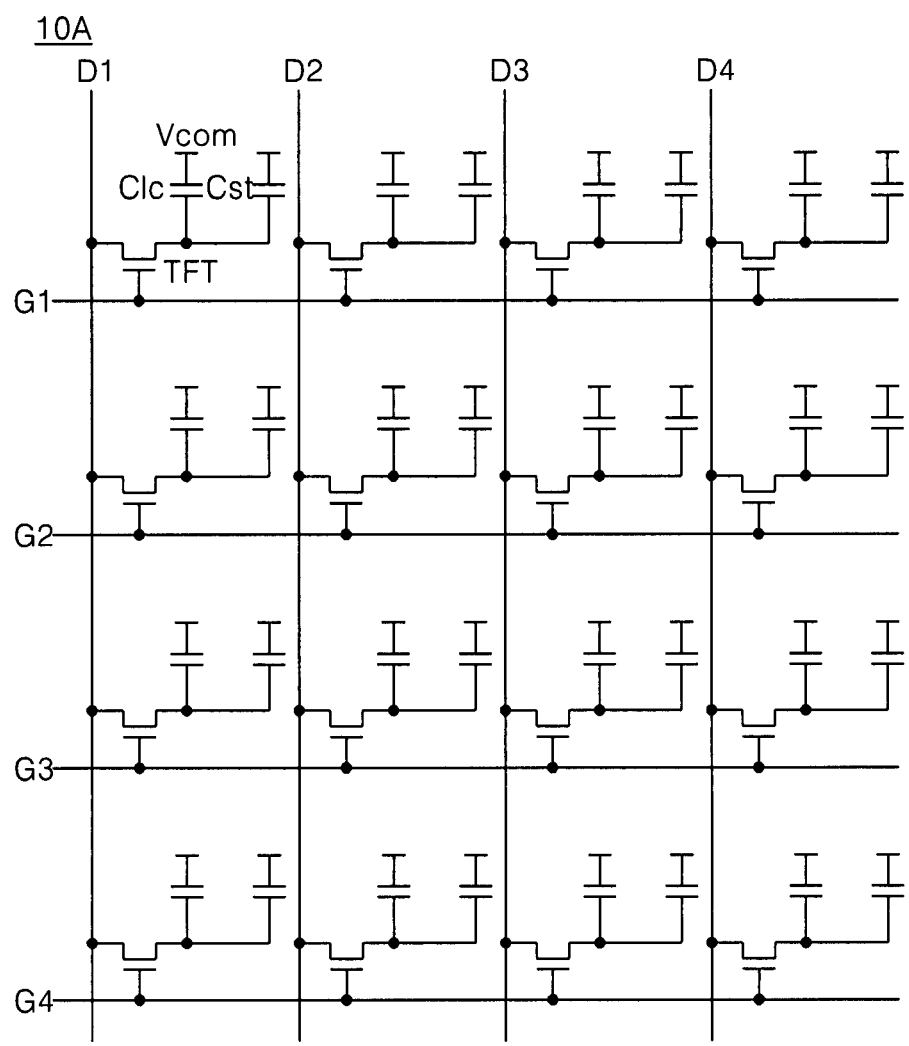
FIG. 3 shows a circuit diagram of a part of a pixel array from FIG. 2.

FIG. 3 shows a circuit diagram of a part of a pixel array from FIG. 2. Referring to FIGS. 2 and 3, the liquid crystal display panel 10 includes a thin film transistor (hereinafter, referred to as "TFT") substrate and a color filter substrate. A liquid crystal layer is formed between the TFT substrate and the color filter substrate. In the TFT substrate, the data lines D1 to Dm and the gate lines G1 to Gn are formed to perpendicularly cross each other on a lower glass substrate, and liquid crystal cells Clc are disposed in a matrix pattern in the cell areas defined by the data lines D1 to Dm and the gate lines G1 to Gn. The TFTs formed in the crossing parts of the data lines D1 to Dm and the gate lines G1 to Gn transmit the data voltages, which is supplied through the data lines D1 to Dm, to the pixel electrodes of the liquid crystal cells. To this end, a gate electrode of the TFT is connected to the gate line G1 to Gn, and a source electrode thereof is connected to the data line D1 to Dm. A drain electrode of the TFT is connected to the pixel electrode of the liquid crystal cell Clc. A common voltage Vcom is supplied to a common electrode facing the pixel electrode.

The color filter substrate includes a black matrix and color filters which are formed on an upper glass substrate.

On the other hand, the common electrode is formed on an upper glass substrate in a vertical electric field drive method such as a twisted nematic (TN) mode and a vertical alignment (VA) mode, and is formed on a lower glass substrate along with the pixel electrode in a horizontal electric field drive method such as an in-plane switching (IPS) mode and a fringe-field switching (FFS) mode.

A storage capacitor Cst can be formed by overlapping the gate line and the pixel electrode of the liquid crystal cell Clc. Alternatively, the storage capacitor Cst can also be formed by overlapping the pixel electrode and the separate common line.

The source driver 11 includes a plurality of data integrated circuits (hereinafter, referred to as "IC"). The source driver 11 converts digital video data RGB inputted from the control board 30 into positive or negative analog gamma compensation voltages under control of the control board 30, and supplies the analog gamma compensation voltages to the data lines D1 to Dm as analog data voltages.

The gate driver 12 includes a plurality of gate ICs. The gate driver 12 sequentially supplies scan pulses to the gate lines G1 to Gn under control of the control board 30. The data ICs of the source driver 11 and the gate ICs of the gate driver 12 might be formed on the lower glass substrate by a chip-on-glass (COG) method or a tape-automated-bonding (TAB) method using a tape carrier package (TCP). The gate ICs of the gate driver 12 might be directly formed on the lower glass substrate by the same process as the TFT process at the same time when the TFTs of the pixel array 10A are formed.

The cameras 21A to 21D can be, for example, CMOS (complementary metal oxide semiconductor) sensors. The cameras 21A to 21D can be positioned at the four corners of the pixel array 10A on the liquid crystal display panel 10. Each of the cameras 21A to 21D takes the image of the surface of the display panel corresponding to the pixel area and the vicinity thereof. The CMOS sensor used as the camera 21A to 21D can have a resolution from about 320×240 pixels to about 1280×1024 pixels. The touch image taken from each of the cameras 21A to 21D is supplied to the control board 30.

Figure 4:
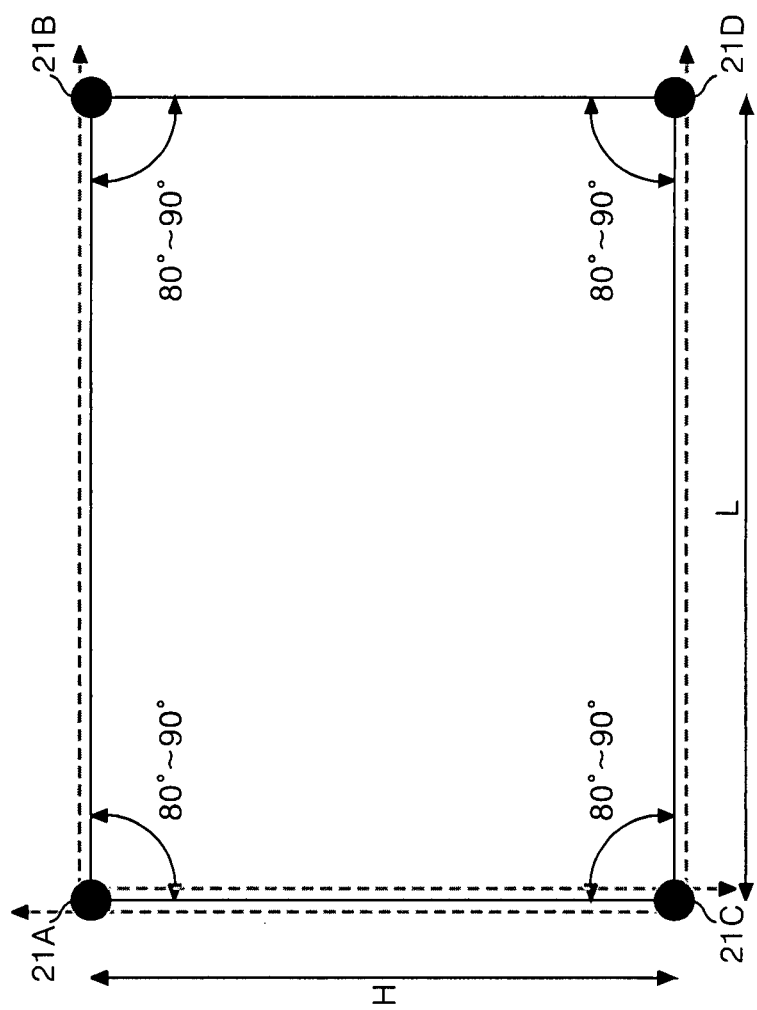
FIG. 4 illustrates exemplary angles of view for cameras attached to a display according to an embodiment of the present invention.

FIG. 4 illustrates exemplary angles of view for cameras attached to a display according to an embodiment of the present invention. Referring to FIG. 4, the lens angle of view of each camera 21A to 21D is chosen to be about 90°. The lens angle of view of cameras 21A to 21D can be changed in accordance with the distance between the liquid crystal display panel 10 and the cameras 21A to 21D, or a size of the liquid crystal display panel 10. In an embodiment of the invention, the viewing angle of each of the lenses 21A to 21D is around 80°-90°. This is because if the lens angle of view of the cameras 21A to 21D becomes narrow than 80°, a shade area not taken by the cameras 21A to 21D increases, thereby preventing a correct detection of the multi-touch area. Moreover, if the lens angle of view is wider than 90°, an extraneous part off the liquid crystal display panel is included, also preventing a correct detection of the multi-touch area.

Figure 5:
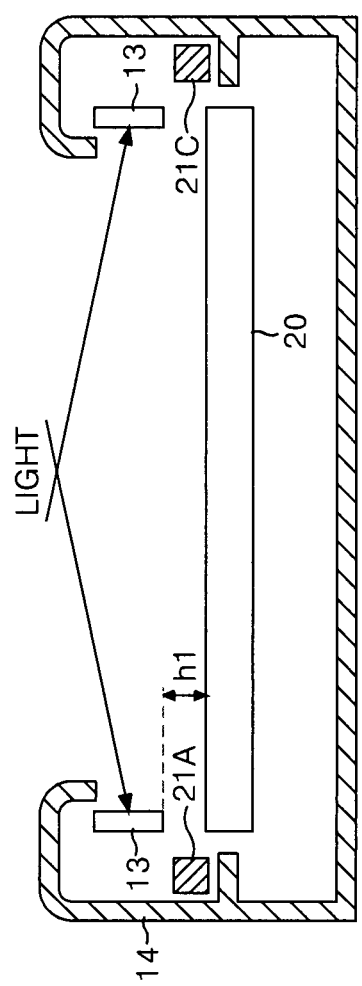
FIG. 5 is a cross sectional view of the display device of FIG. 1 showing exemplary positions of non-reflective members according to an embodiment of the present invention.

FIG. 5 is a cross sectional view of the display device of FIG. 1 showing exemplary positions of non-reflective members according to an embodiment of the present invention. Referring to FIG. 5, non-reflective members 13 are installed in the vicinity of the edge of the glass substrate of the liquid crystal display panel 10. The non-reflective members 13 includes any one of an anti-reflector, a black layer and two sheets of polarizing filters which are deposited for their optical absorption axes to cross each other. The non-reflective members 13 are disposed in front of the lens of the cameras 21A to 21D, and are lifted upward as much as a designated height (h1) from the surface of the glass substrate. The height (h1) between the non-reflective members 13 and the surface of the glass substrate of the liquid crystal display panel 10 is inversely proportional to the size of the liquid crystal display panel 10, is proportional to the distance between the glass substrate and the camera lens. In an embodiment, the height h1 is in a range from a few to dozens of millimeters (mm).

The non-reflective members 13 and the cameras 21A to 21D are fixed to the edge of a bracket 14 which supports the touch and display module 20. The non-reflective members 13 absorbs or shields an external light and acts to prevent an optical interference phenomenon caused by the external light incident to the lens of the cameras 21A to 21D.

The control board 30 is connected to the source driver 11 and the gate driver 12 through a flexible printed circuit (FRC) and a connector. The control board 30 includes a timing controller 31 and a multi-touch processor 32. The timing controller 31 generates a gate control signal for controlling the operation timing of the gate driver 12 and a data control signal for controlling the operation timing of the source driver 11 using vertical/horizontal signals V,H and a clock CLK. Further, the timing controller 31 supplies the digital video data RGB inputted from the system 40 to the source driver 11. The timing controller may synchronize the cameras 21A to 21D to each other to capture images of the surface of display panel nearly simultaneously. By synchronizing the capture of the images by the cameras 21A to 21D, the location of the touch area can be detected with a better precision.

The multi-touch processor 32 is periodically inputted with digital video data RGB of the background image from the timing controller 31 in response to the vertical/horizontal synchronization signals V, H and the clock CLK to store the data RGB, and executes a multi-touch signal processing program to compare a background image taken previously with a touch image taken currently by the cameras 21A to 21D, thereby extracting a touch image. Herein, the background image taken previously by the cameras 21A to 21D is stored at a memory of the multi-touch processor 32. And, the multi-touch processor 32 calculates the coordinates for the touch image and supplies the result Txy thereof to the system 40. The multi-touch processor 32 shares the timing signal such as the vertical/horizontal synchronization signals V, H and the clock CLK with the timing controller 31, thereby operating in synchronization with the timing controller 31. Accordingly, because the timing controller 31 is synchronized with the multi-touch processor 32, the display of the composite image of the touch image and the background image displayed in the liquid crystal display panel 10 and the coordinate calculation processing of the touch point can be synchronized.

The system 40 includes a memory in which an application program is embedded; a central processing unit (CPU) for executing the application program; and a graphic-processing circuit for compounding the background image and the touch image and processing the signal interpolation of the composite data, the resolution conversion thereof and the like. The system 40 receives the coordinate data Txy from the multi-touch processor 32 and executes the application program linked to the coordinate value of the coordinate data. For example, if there is an icon of a specific program in coordinates of a touch point, the system 40 loads the program into the memory and executes the program. Further, the system 40 might be implemented on a personal computer (PC), and interchanges data with the multi-touch processor 32 through a serial or universal serial bus USB interface.

Figure 6:
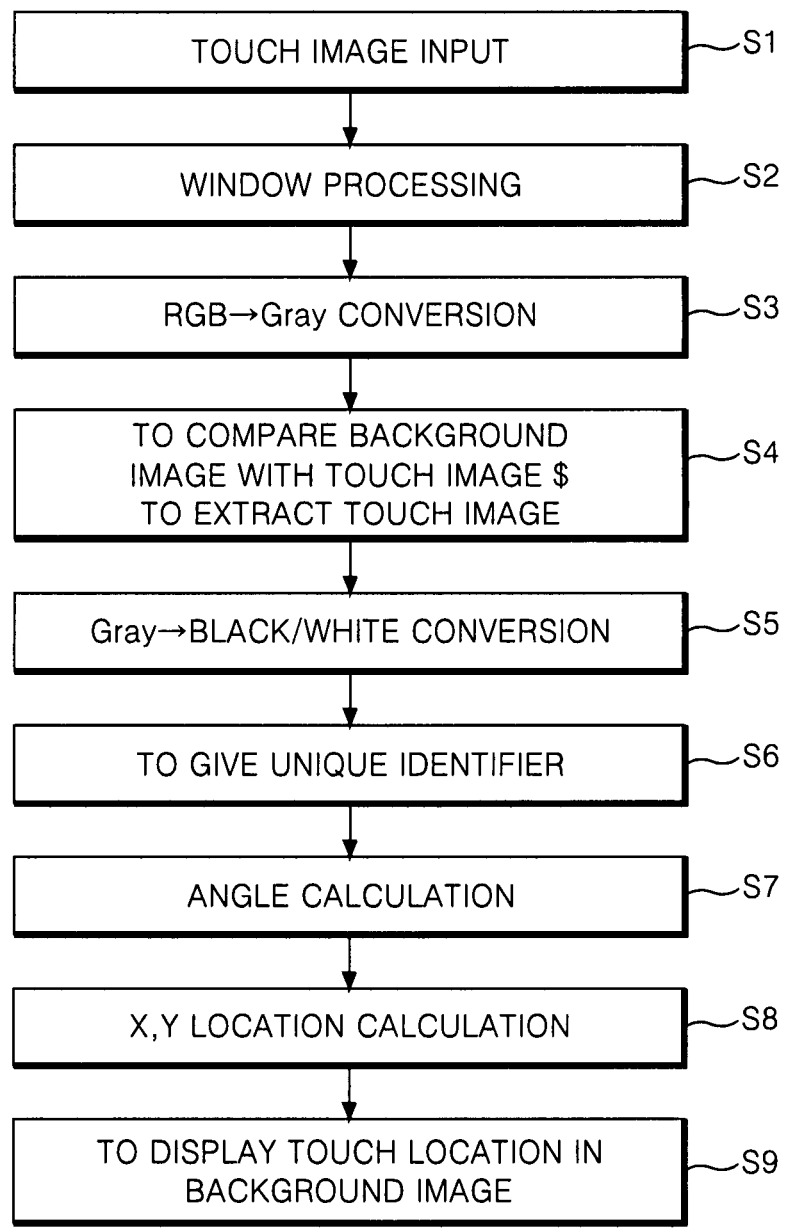
FIG. 6 is a flow chart representing a control sequence of a multi-touch signal processing program according to an embodiment of the present invention.
Figure 7:
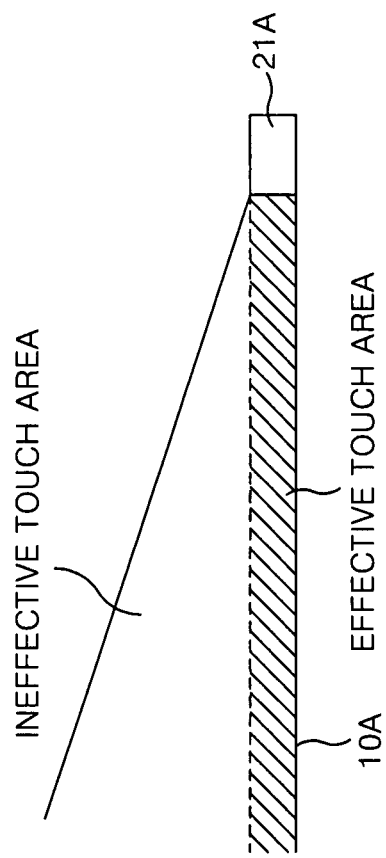
FIG. 7 shows exemplary touch areas on a display device according to an embodiment of the present invention.

FIG. 6 is a flow chart representing a control sequence of a multi-touch signal processing program according to an embodiment of the present invention. FIG. 7 shows exemplary touch areas on a display device according to an embodiment of the present invention. Referring to FIG. 6, the multi-touch signal processing program receives the touch image taken by the cameras 21A to 21D and extracts the image of an effective touch area through a window processing. (S1 and S2). Referring to FIG. 7, the touch image taken from the cameras 21A to 21D includes the image of an ineffective touch area pertinent to the space above the touch surface as well as the image of an effective touch area taken in the touch surface of the pixel array. Accordingly, the multi-touch signal processing program extracts the image (shaded part) of the effective touch area where the touch is made in the vicinity of the touch surface from the image taken from each camera 21A to 21D, through the window processing. The window processing uses an image extraction technique such that only a target image is extracted for the input image signal through a sub-matrix operation.

Subsequently, the multi-touch signal processing program converts R, G, B data included in the image of the effective touch area extracted by the window processing into gray level values or gray scale intensities. (S3). The image taken by the cameras 21A to 21D includes R, G, B data, and the effective touch image extracted by the window processing also includes R, G, B data. The R, G, B data from the effective touch image are converted into the gray scale values in accordance with Mathematical Formula 1 below in the step of S3. To detect the touch information, the gray level values in the background image displayed in the pixel area 10A of the liquid crystal display panel 10 and the gray level values of the image captured by the cameras are compared on the basis of the gray level.

$$\text{Gray scale intensity} = pR + qG + sB \qquad \text{[Mathematical Formula 1]}$$

Herein, 'p', 'q' and 's' are constants having different values from each other.

In an embodiment of the invention, the touch image detection is performed by comparing a background image, which is for example the image displayed in the pixel area 10A of the liquid crystal display panel 10 to the image captured by one of the cameras 21A to 21D to extract the corresponding touch image showing where the actual touch is made. In another embodiment, touch image detection is performed by comparing a previously stored image captured by one of the cameras 21A to 21D with a new image captured by the corresponding one of the cameras 21A to 21D to extract the corresponding touch image showing where the actual touch is made. The extraction of the touch image can be achieved, for example, by a difference operation between the background (or the previously stored captured image) with the new captured image. (S4).

Subsequently, the multi-touch signal processing program compares the gray scale intensity of the touch image extracted in S4 with the pre-set threshold value. And, the multi-touch signal processing program converts the gray scale intensity of the touch image into white data only for the data of not less than the threshold value, and converts the data of below the threshold value into the black data. (S5) The white data represent an effective touch location, and the black data represent the ineffective data which are not actually touched in the touch image. The threshold value can be determined by experiments.

Figure 8:
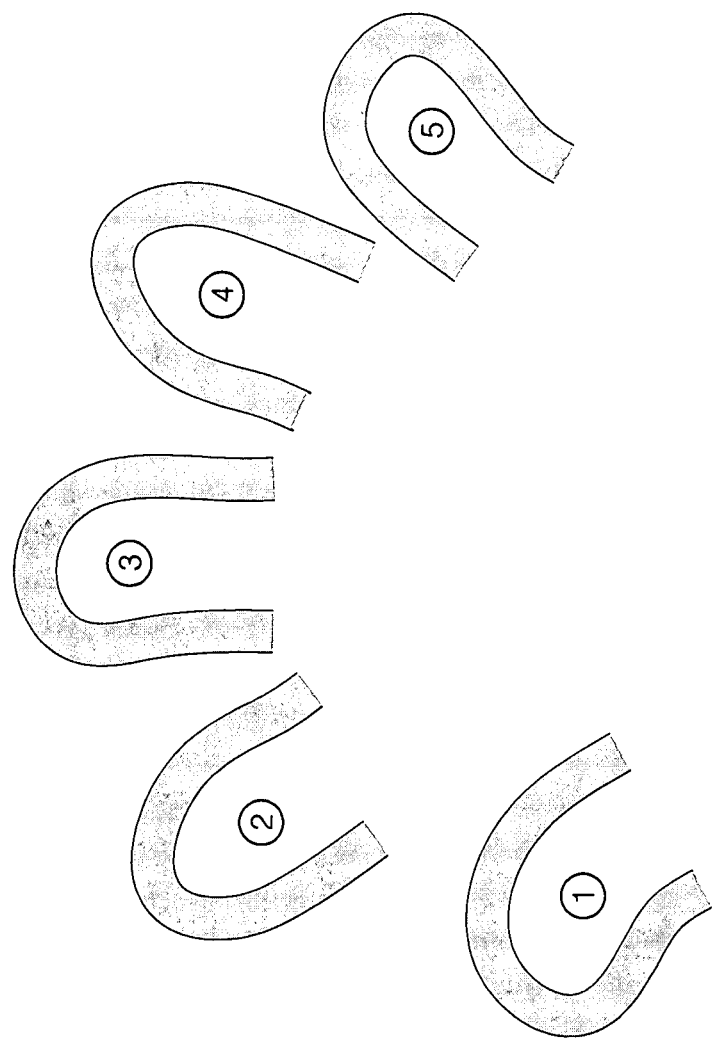
FIG. 8 shows a schematic description of exemplary touch areas identification according to an embodiment of the present invention.

FIG. 8 shows a schematic description of exemplary touch areas identification according to an embodiment of the present invention. Referring to FIG. 8, in the step of S6, the multi-touch signal processing program identifies detected touch areas using a unique identifier (1 to 5, for example) for each of the white data, i.e., effective touch location data.

Subsequently, the multi-touch signal processing program computes the angle of the camera facing the effective touch area using an angle calculation algorithm in order to find the location on the two-dimensional plane for each of the effective touch areas converted. Then, the multi-touch signal processing program calculates the two-dimensional location using a triangulation operation based on the computed angles data in accordance with the mathematical formula 2 below. (S7 and S8).

Figure 9:
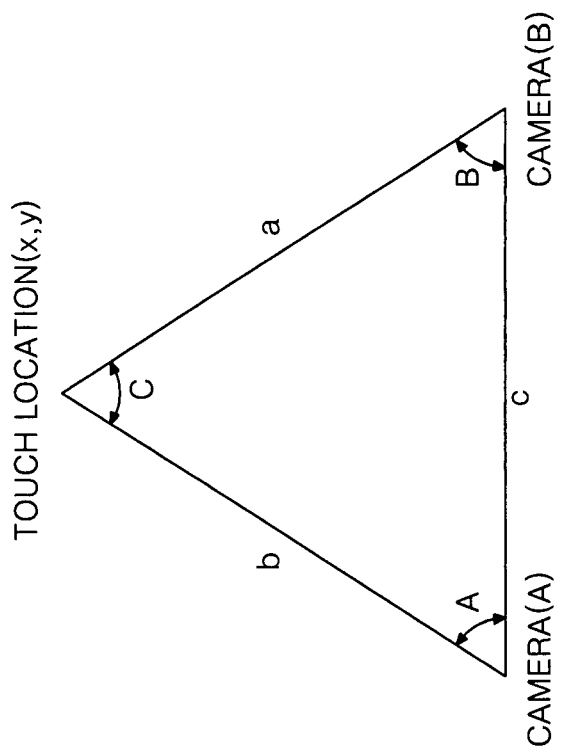
FIG. 9 shows a schematic description of a triangulation operation according to an embodiment of the present invention.

FIG. 9 shows a schematic description of a triangulation operation according to an embodiment of the present invention The following mathematical formula 2 is a calculation formula calculating one touch location to the two-dimensional xy coordinates value, and includes angles A and B which are measured by two cameras, an angle C between the touch location and the cameras, and distances a, b, and c between two cameras and the touch location. Herein, the angle C between the touch location and the cameras is calculated as "C=180−A−B".

$$a = c * \frac{\sin A}{\sin B}$$
$$b = c * \frac{\sin B}{\sin C}$$
$$x = b * \cos A$$
$$y = b * \sin A$$

[Mathematical Formula 2]

In this way, if the x, y coordinate data (Cxy) for each touch location is calculated from the multi-touch signal processing program, the system 40 generates touch data using the coordinate data thereof and compounds the touch data with the background image which is to be displayed in the liquid crystal display panel 10. The touch data compounded with the background data is transmitted to the timing controller 31 to be displayed in the liquid crystal display panel 10. The touch data combined with the background image can be displayed in various forms.

In the multi-touch location calculation process of S7 and S8, the driving method of the display device having the multi-touch recognition function according to the embodiment of the present invention might include a process of verifying the locations of the touch points calculated by the triangulation, as in Mathematical Formula 2.

Figure 10:
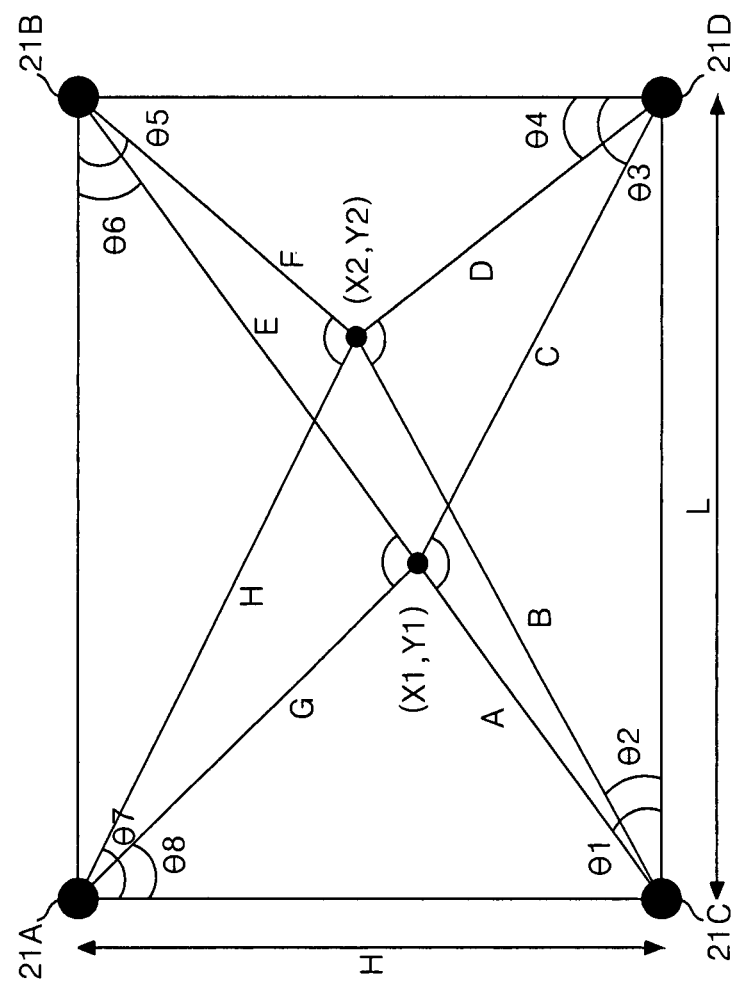
FIG. 10 shows a schematic description of a verification operation according to an embodiment of the present invention.

FIG. 10 shows a schematic description of a verification operation according to an embodiment of the present invention. Referring to FIG. 10, assuming that there are two multi-touch points (X1, Y1), (X2, Y2) on the display surface 10A, the triangulation result of four pairs of cameras (21C and 21D, 21A and 21B, 21B and 21D, 21A and 21C) which are adjacent to each other for each of the two points is compared and decided, as in Mathematical Formula 3.

$X1$: $A\times\cos(\theta 1)\&\&(L-C\times\sin(\theta 3))\&\&(H-E\times\cos(\theta 6))$
$\&\&G\times\sin(\Theta 8)$ $Y1$: $A\times\sin(\theta 1)\&\&(L-C\times\cos(\theta 3))\&\&(H-E\times\sin(\theta 6))$
$\&\&G\times\cos(\Theta 8)$ $X2$: $B\times\cos(\theta 2)\&\&(L-D\times\sin(\theta 4))\&\&(H-F\times\cos(\theta 5))$
$\&\&H\times\sin(\theta 7)$ $Y2$: $B\times\sin(\theta 2)\&\&(L-D\times\cos(\theta 4))\&\&(H-F\times\sin(\theta 5))$
$\&\&H\times\cos(\theta 7)$ [Mathematical Formula 3]

In Mathematical Formula 3, "&&" represents the comparison operation. The multi-touch signal processing program does not take the location as the touch location if the error value of the location measured by the adjacent camera pairs (21C and 21D, 21A and 21B, 21B and 21D, 21A and 21C) in the verification process, as in FIG. 10 and Mathematical Formula 3, exceeds the pre-set threshold value.

The display device and the driving method thereof having the multi-touch recognition function according to the embodiment of the present invention can not only minimize the deterioration factor of the aperture ratio by disposing the cameras in the area except the pixel array, but can also minimize the deterioration of the structural stability without the appearance deformation of the integrated display device by integrating the touch recognition module with the liquid crystal display module. Particularly, the present invention recognizes the multi-touch location in the display device, and displays the background image and the touch image at the display device in real time, so that the present invention can apply to a touch recognition, an image scanning, and a finger print recognition, etc.

On the other hand, the liquid crystal display panel 10 of the touch and display module 20 can be replaced with other flat display panels, e.g., a display panel of an organic light emitting diode OLED, a plasma display panel PDP, a display panel of a field emitting display FED, or a display panel of a three-dimensional image display device inclusive of the flat display panel.

As described above, the display device and the driving method thereof having the multi-touch recognition function according to the embodiment of the present invention can not only minimize the deterioration factor of the aperture ratio by disposing the cameras in the area except the pixel array, but can also minimize the deterioration of the structural stability without the appearance deformation of the integrated display device by integrating the touch recognition module with the liquid crystal display module. Furthermore, the present invention can optimize a circuit controlling the liquid crystal display module and processing the touch recognition.

It will be apparent to those skilled in the art that various modifications and variations can be made in embodiments of the present invention. Thus, it is intended that embodiments of the present invention cover the modifications and variations of the embodiments described herein provided they come within the scope of the appended claims and their equivalents.

What is claimed is:

1. A display device having a multi-touch recognition function, comprising:
a display panel for displaying display data representative of a display image;
a plurality of cameras disposed at an edge of the display panel;
a processor that detects a touch area using at least first and second images captured by two cameras of the plurality of cameras, respectively, the touch area being located on a touchable side of the display panel;
a controller synchronized with the processor to control the displaying of a background image on the display panel and the capture of the first and second images by the processor,
at least one non-reflective member in such a spatial relationship with a corresponding each of the plurality of cameras as to prevent an optical interference from an incident light; and
a bracket for receiving the display panel, the plurality of cameras and the at least one non-reflective member,
wherein a first camera of two cameras captures the first image of the display panel and a second camera of two cameras captures the second image of the display panel, respectively, and the processor compares each of the first and second captured images with a displayed image to detect the touch area, and wherein the controller synchronizes the first and second cameras to capture the first and second images substantially simultaneously, wherein the at least one non-reflective member includes one of a black layer, an anti-reflector, and first and second polarizing filters which are deposited, the optical absorption axes of which cross each other, and wherein the at least one non-reflective member is substantially in front of the corresponding each of the plurality of cameras and is lifted upward as much as a designated height from a surface of the display panel, and wherein the bracket has protrusions at an inner side facing the edges of the display panel, and wherein the plurality of cameras are disposed on the protrusions and the at least one non-reflective member is overlapped with the edge of the display panel, wherein the protrusions are parallel to the display panel, and wherein a bending portion of the bracket covers a top of the at least one non-reflective member.

2. The display device of claim 1, wherein a viewing angle of each of the first and second cameras is in a range of about 80 to about 90 degrees.

3. The display device of claim 1, wherein the height of the at least one non-reflective member above the touchable side of the display panel is proportional to a distance between the touchable side of the display panel and the corresponding one of the cameras.

4. The display device of claim 1, wherein the plurality of cameras further includes third and fourth cameras capturing third and fourth images of the display panel, respectively, and the processor verifies the touch area detected by the first and second cameras with the touch area detected by the third and fourth cameras.

5. A display device, comprising:
a display panel for displaying display data representative of a display image;
first and second capture devices assembled with the display panel, each of the first and second capture devices substantially simultaneously capturing first and second captured images of the display panel;
a processor that compares the display data with each of the first and second captured images to detect a touch area on the display panel, the touch area being located on a touchable side of the display panel;
third and fourth capture devices assembled with the display panel, each of the third and fourth capture devices capturing third and fourth captured images of the display panel;
at least one non-reflective member in such a spatial relationship with a corresponding each of the first to the fourth capture devices as to prevent an optical interference from an incident light; and
a bracket for receiving the display panel, the first to fourth capture devices and the at least one non-reflective member,
wherein the processor compares the display data with each of the third and fourth captured images to detect the touch area on the display panel,
wherein the at least one non-reflective member includes one of a black layer, an anti-reflector, and first and second polarizing filters which are deposited, the optical absorption axes of which cross each other, and wherein the at least one non-reflective member is substantially in front of the corresponding each of the first to the fourth capture devices and is lifted upward as much as a designated height from a surface of the display panel, wherein the bracket has protrusions at an inner side facing the edges of the display panel, and wherein the first to fourth capture devices are disposed on the protrusions and the at least one non-reflective member is overlapped with the edge of the display panel, wherein the protrusions are parallel to the display panel, and wherein a bending portion of the bracket covers a top of the at least one non-reflective member.

6. The display device of claim 5, wherein the height of the at least one non-reflective member above the touchable side of the display panel is proportional to a distance between the touchable side of the display panel and the corresponding one of the capture devices.

7. The display device of claim 5, wherein a viewing angle of each of the first and second capture devices is small enough to prevent a capture of an unwanted portion of the display panel but large enough to reduce a shade area excluded from the first captured image.

8. The display device of claim 7, wherein the viewing angle of each of the first and second capture devices is in a range of about 80 to about 90 degrees.

9. The display device of claim 5, wherein the processor verifies the touch area detected by the first and second capture devices with the touch area detected by the third and fourth capture devices.

10. The display device according to claim 1, wherein the non-reflective member is located at the edge of the display panel.

11. The display device of claim 1, wherein the plurality of cameras further includes third and fourth cameras capturing third and fourth images of the display panel, respectively, the display device thereby being configured to detect two touch areas, and
when there are two touch points, the processor compares a triangulation result of four pairs of the cameras that are adjacent to each other for each of the two touch points, and if an error value resulting from the comparison of an adjacent camera pair is greater than a threshold, the processor does not take the triangulation result of the adjacent camera pair as either of the touch areas.

12. The display device of claim 5, wherein the display device includes a multi-touch recognition function, the display device thereby being configured to detect two touch areas, and when there are two touch points, the processor compares a triangulation result of four pairs of the capture devices that are adjacent to each other for each of the two touch points, and if an error value resulting from the comparison of an adjacent pair of capture devices is greater than a threshold, the processor does not take the triangulation result of the adjacent pair of capture devices as either of the touch areas.

* * * * *